Jan. 22, 1957  E. G. EDWARDS  2,778,398
SCRUB PAIL ACCESSORY
Filed Oct. 25, 1955  2 Sheets-Sheet 2
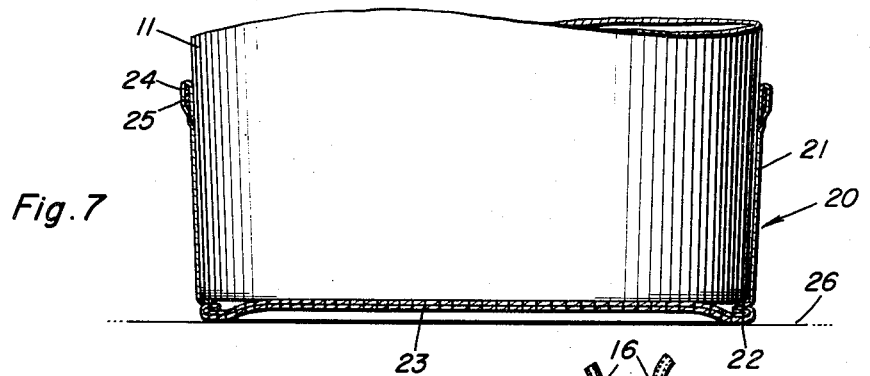
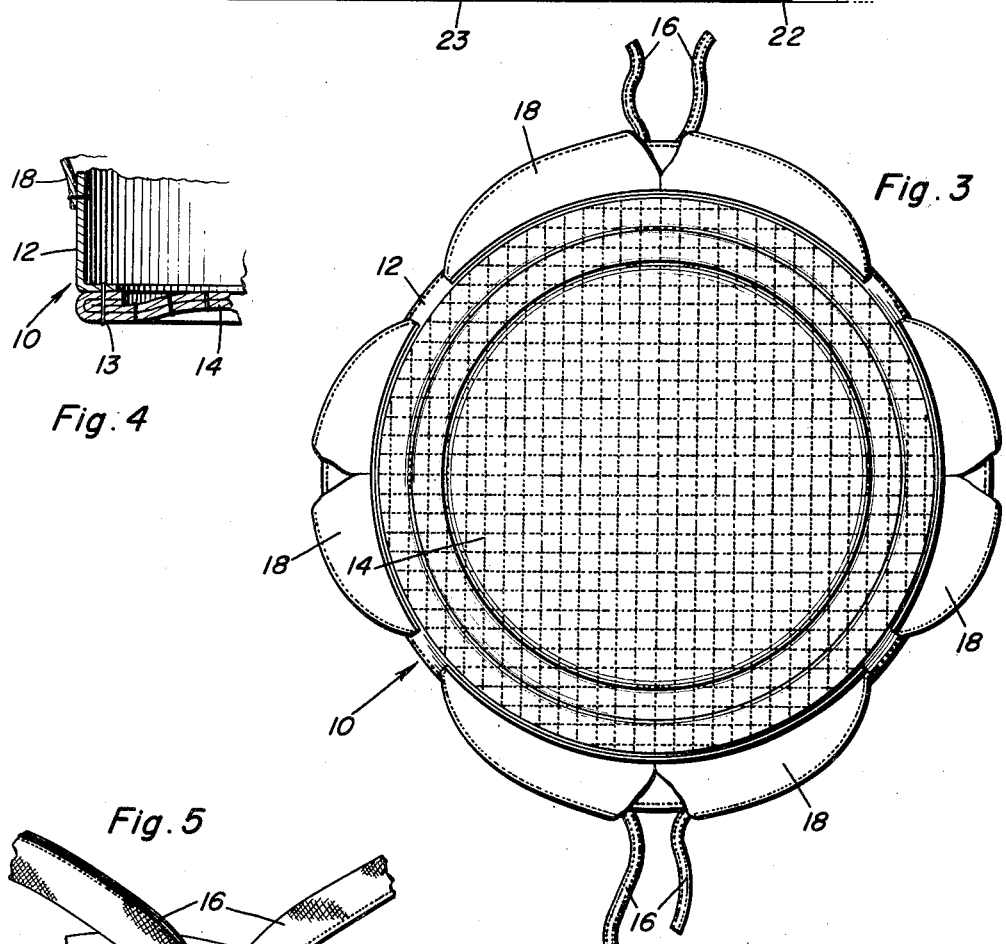
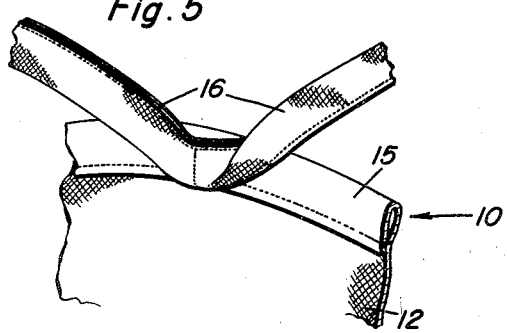
Elizabeth G. Edwards
INVENTOR.

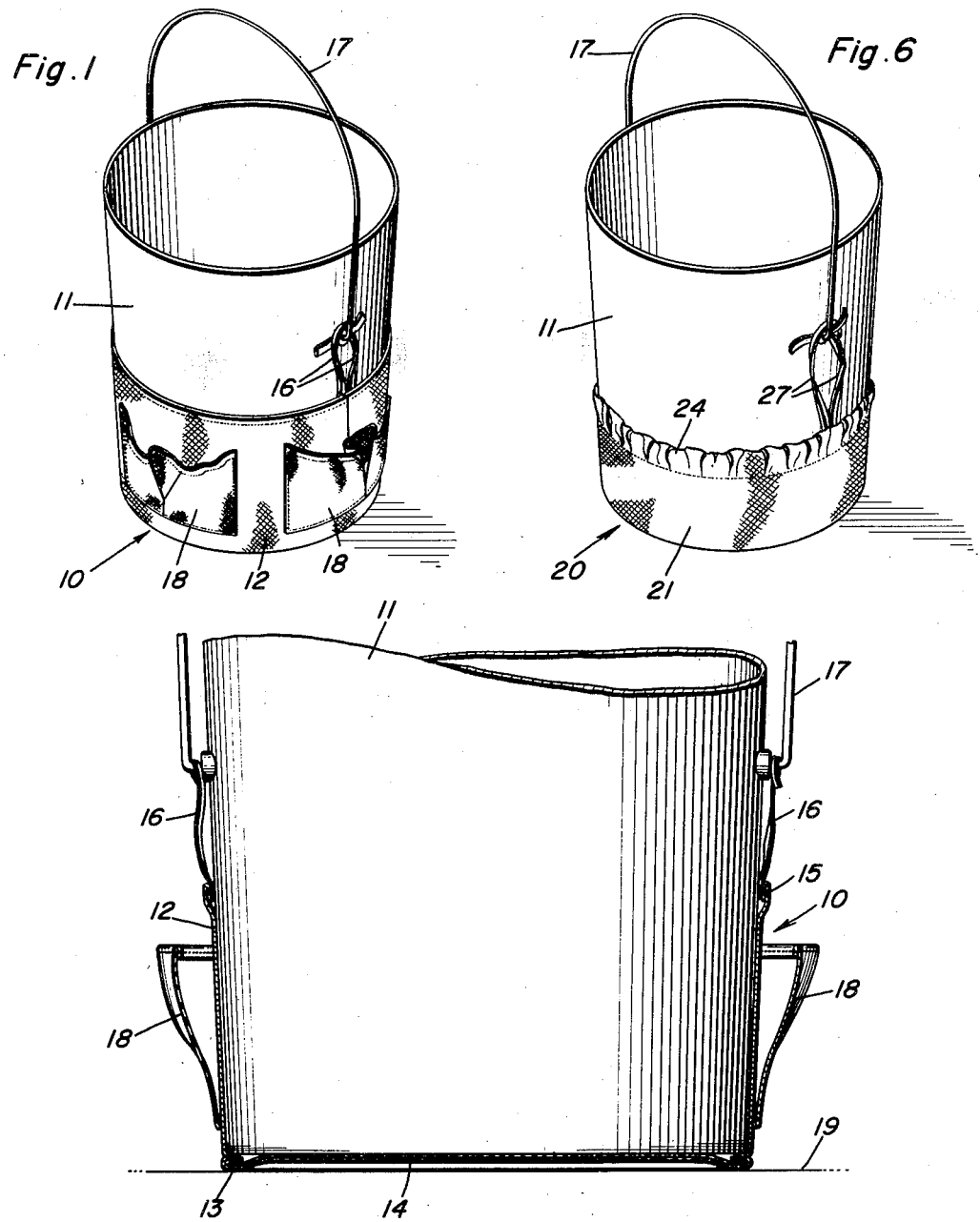

of the receptacle 10 at diametrically spaced points. The tapes 16 are adapted to be tied around the end portions of the usual bail or handle 17 of the pail 11. Thus, the receptacle 10 is firmly secured in position on the pail 11.

United States Patent Office 2,778,398
Patented Jan. 22, 1957

2,778,398

SCRUB PAIL ACCESSORY

Elizabeth G. Edwards, Philadelphia, Pa.

Application October 25, 1955, Serial No. 542,664

1 Claim. (Cl. 150—52)

This invention relates to scrub pail accessories and has for one of its important objects to provide novel means for protecting floors and other surfaces on which such pails may be placed from being scratched or otherwise damaged thereby.

Another very important object of the present invention is to provide, in a manner as hereinafter set forth, unique means for holding for convenient use on a scrub pail or bucket the usual supplies and implements such as cleaning powder, soap, brushes, etc.

Other objects of the invention are to provide a scrub pail accessory or attachment of the aforementioned character which will be of relatively simple construction, durable, of light weight, attractive in appearance and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view, showing an accessory constructed in accordance with the present invention mounted on a scrub pail or bucket;

Figure 2 is a view in vertical section therethrough;

Figure 3 is a bottom plan view of the device;

Figure 4 is a fragmentary view in vertical section through a lower portion of the device;

Figure 5 is a fragmentary view in perspective of an upper portion of the device;

Figure 6 is a perspective view, showing a modified form of the invention mounted on a scrub pail or bucket; and Figure 7 is a vertical sectional view through the modification of Figure 6.

Referring now to the drawings in detail, and to Figures 1–5, inclusive, thereof in particular, it will be seen that reference character 10 designates generally a cylindrical container or receptacle of suitable flexible material. The container or receptacle 10 is for the reception of the lower portion of a conventional scrub pail or bucket 11. Toward this end, the receptacle 10 includes a cylindrical wall 12 which terminates in an inturned lower end portion having stitched therebeneath, in a manner to provide an annular seam 13, the turned marginal portion of a quilted bottom 14 of two or more thicknesses of material. At its upper end, the cylindrical wall 12 of the receptacle 10 terminates in an inturned hem 15.

Pairs of tapes 16 are stitched to the upper portion of the receptacle 10 at diametrically spaced points. The tapes 16 are adapted to be tied around the end portions of the usual bail or handle 17 of the pail 11. Thus, the receptacle 10 is firmly secured in position on the pail 11.

Secured by stitching or in any other suitable manner at circumferentially spaced points on the cylindrical wall 12 of the receptacle 10 is a plurality of pockets 18. The pockets 18 are for the reception of cleaning supplies and accessories such, for instance, as soap, powder, brushes, etc.

In use, the receptacle 10 is fitted on the lower portion of the pail 11 and secured by the tapes 16, the peripheral portion of the pail bottom resting on the annular seam 13. The desired products and articles are then inserted in the pockets 18 and are thus conveniently at hand for use at all times. The quilted pad-like bottom 14, including annular seam 13, of the receptacle 10 functions as a cushion in addition to protecting the floor, as indicated at 19, or other support on which the pail may be placed. When desired, the device may be readily removed from the pail and, being flexible, compactly folded for storage. If desired, hooks (not shown) engageable over the top of the pail 11, may also be provided for securing the receptacle 10 in position on said pail.

In the modification of Figures 6 and 7 of the drawings, reference character 20 designates generally a flexible, cylindrical receptacle or container for the reception of the pail 11. The receptacle 20 includes a cylindrical wall 21 having stitched to its lower end, as indicated at 22, a quilted bottom 23 of two or more thicknesses of material. The seam 22 is similar to the seam 13. The upper end portion of the cylindrical wall 22 is turned and stitched to provide a hem 24 which encloses an elastic band 25 for frictionally securing the receptacle 20 in position on the pail 11. Tapes 27, similar to the tapes 16, positively secure the receptacle 20 on the pail 11. If desired, this form of the invention may also include hooks (not shown) for securing the receptacle 20 in position on the pail, said hooks for engagement over the top of said pail. The receptacle 20, comprising the pad-like bottom 23, protects the floor, as indicated at 26, or other surface on which the pail 11 may be placed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

An accessory of the character described for substantially cylindrical scrub pails of the type including a bail, said accessory comprising: a flexible, foldable receptacle for the reception of the lower portion of the pail, said receptacle including a substantially cylindrical wall terminating in an inturned lower end portion and a quilted, laminated, pad-like bottom having its marginal portion turned and stitched beneath said lower end portion of said wall for providing an annular seam constituting a cushion for receiving thereon the peripheral portion of the pail bottom, a hem on the upper end of said wall, an elastic band in said hem for contracting the upper portion of the receptacle for frictionally gripping the pail, and pairs of tapes secured on said hem at diametrically opposite points and adapted to be tied to the end portions of the bail for positively securing the receptacle on the pail.

References Cited in the file of this patent

UNITED STATES PATENTS

| | | |
|---|---|---|
| 1,687,004 | Briggs | Oct. 9, 1928 |
| 2,035,384 | Hinchliff | Mar. 24, 1936 |
| 2,087,611 | Wells | July 20, 1937 |
| 2,500,341 | Burnett | Mar. 14, 1950 |
| 2,533,725 | Eisenberg | Dec. 12, 1950 |
| 2,610,757 | Irvine | Sept. 16, 1952 |
| 2,685,318 | Merkle | Aug. 3, 1954 |